April 14, 1942.  E. C. LANG  2,279,573
CONVEYER SYSTEM
Filed Oct. 10, 1940  2 Sheets-Sheet 1
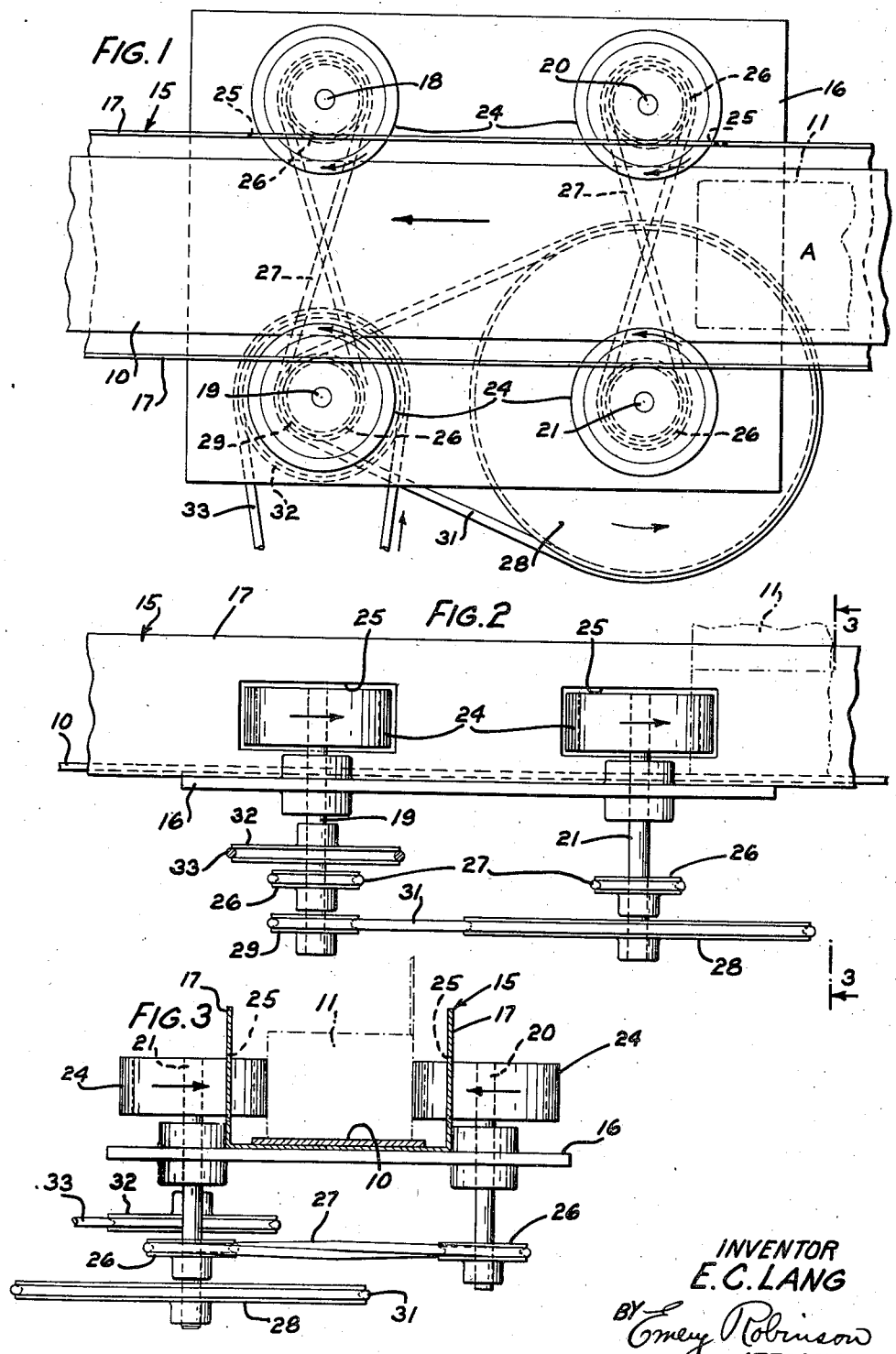
INVENTOR
E. C. LANG
BY Emery Robinson
ATTORNEY April 14, 1942.  E. C. LANG  2,279,573
CONVEYER SYSTEM
Filed Oct. 10, 1940  2 Sheets-Sheet 2
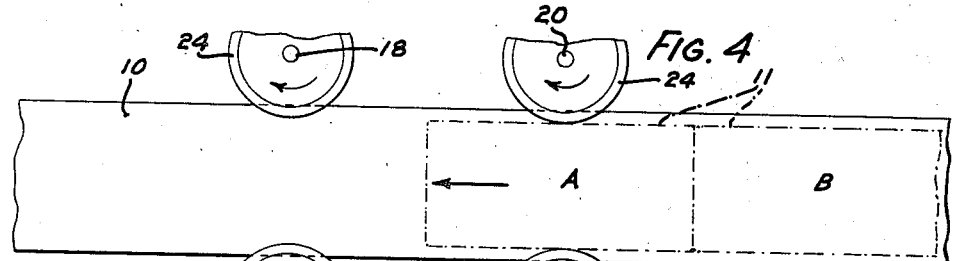
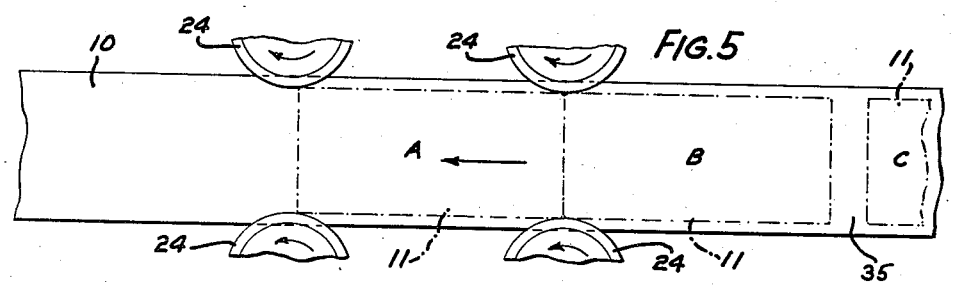
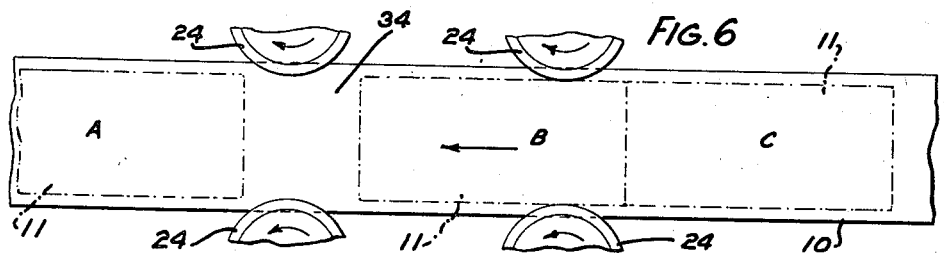
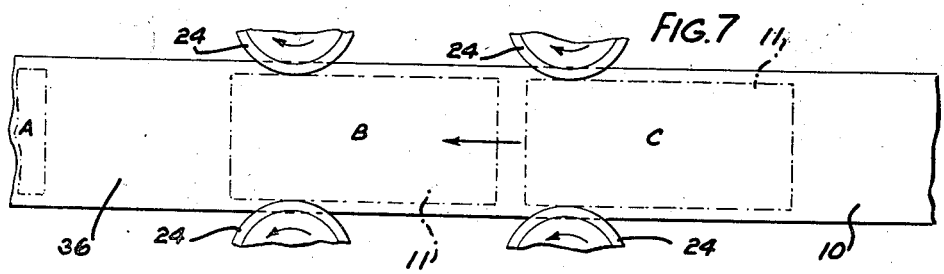
INVENTOR
E. C. LANG
BY Emery Robinson
ATTORNEY Patented Apr. 14, 1942

2,279,573

UNITED STATES PATENT OFFICE 2,279,573

CONVEYER SYSTEM

Edd C. Lang, Oak Park, Ill., assignor to Western Electric Company, Incorporated, New York, N. Y., a corporation of New York Application October 10, 1940, Serial No. 360,587

2 Claims. (Cl. 198—34)

This invention relates to conveyer systems and more particularly to mechanism for effecting a desired spaced relation between articles after being entered in the system and maintaining such spaced relation during the conveying of the articles for subsequent handling in the system.

An object of the invention is to provide a simple and practical article spacing mechanism, particularly for use in a conveyer system.

In accordance with one embodiment of the invention as applied to an article conveying system, there is provided an article spacing mechanism in which advancing articles are caused to pass first between a pair of rolls driven at a relatively low speed with respect to their movement in the system and then between a pair of rolls driven at a relatively higher speed than the first rolls and predeterminedly spaced therefrom. As the articles are moved past the first pair of rolls they are retarded and this retarding action determines the spacing between successive articles. The action of the second pair of rolls combined with that of the first pair of rolls provides means whereby successive variously spaced articles, articles in end to end contact or articles tending to stick together, will be positively separated a desired uniform distance.

Other objects and advantages of this invention will more fully appear from the following detailed description, taken in connection with the accompanying drawings, in which Fig. 1 is a fragmentary plan view of a conveyer system equipped with an article spacing mechanism embodying the features of this invention;

Fig. 2 is a side view thereof;

Fig. 3 is a vertical section view taken on the line 3—3 of Fig. 2, and

Figs. 4 to 7, inclusive, are diagrammatic views on a reduced scale illustrating relative positions of articles while being advanced in a conveyer system embodying the article spacing mechanism.

Referring to the drawings, particularly to Fig. 1, 10 indicates a portion of an endless conveyer belt of a conveyer system. The belt is driven at a suitable constant speed in the direction of the arrow, indicated thereon, by any suitable means (not shown). The belt 10 in the present application of the invention is adapted to convey packing cartons 11, indicated in broken outline, Figs. 1 and 4 to 7, inclusive, along a horizontal guide channel or trough 15. In the particular application of the conveyer system, which is fragmentarily shown, the cartons at certain points along the belt 10 are assembled by operators folding up blanks which are held in shape by applying mucilage directly to the blanks or by adhesive retained strips, the covers being left open. Upon completing a carton the operator places it on the conveyer belt 10 in the trough 15 and at times it will abut a previously deposited carton, in which case the cartons are very apt to stick together due to the wet mucilage. In other cases, the cartons will be placed on the belt 10 without abutting each other and in varying spaced relation and generally with too little space therebetween for proper handling of the cartons at subsequent points in the system. As the cartons move along the trough 15 they may, for example, be selectively directed by deflectors into one or more of a series of chutes which deliver the empty cartons to work stations or packing benches. A disclosure of the carton deflectors, chutes and packing benches is not believed necessary, since they form no part of the present invention and are not necessary to a full understanding thereof. In a conveyer system of the type referred to it is desirable that the cartons, as they approach the deflectors and chutes, be spaced from each other a desired uniform distance in order that the deflectors may operate properly to cause one carton at a time to be directed into a chute.

The article spacing mechanism of this invention referring particularly to Figs. 1, 2, and 3 is arranged at a suitable point along the trough 15 and comprises a supporting plate 16 disposed below the bottom wall of the trough and extending a suitable distance beyond opposite side walls 17 thereof. Journalled in a suitable manner in the plate 16 outside of the trough walls 17 are four vertical shafts 18, 19, 20 and 21 each having secured to its upper end a rubber faced roll 24, the rolls being disposed a suitable distance above the plane of the belt 10. The rolls 24 extend through openings 25 formed in the trough side walls 17 and the peripheral portions of the rolls extend through the openings and are spaced apart a distance slightly less than the width of the cartons 11, which are moved into engagement therewith by the belt 10. Each of the shafts 18, 19, 20 and 21 has secured thereto a pulley 26 and crossed belts 27 operatively interconnecting the pair of pulleys 26 on the shafts 18 and 19 and the pair of pulleys 26 on the shafts 20 and 21, the pulleys 26 being of similar diameter. Secured to the shaft 21 is a pulley 28 which is connected to a pulley 29 on the shaft 19 by a belt 31. Also secured to the shaft 19 is a pulley 32 which is connected to a pulley (not shown) by a belt 33, the latter pulley being driven at a suitable constant speed in the direction of the arrow by any suitable means (not shown).

It will be apparent that with the belt 33 being driven in the direction of the arrow, that the pulley 32 will be driven in a counterclockwise direction and likewise the shaft 19 and the attached pulleys 29 and 26 and the roll 24. With the pulley 29 driving the pulley 28 by means of the belt 31, the shaft 21 and the attached pulley 26 and the roll 24 will also rotate in a counterclockwise direction. By means of the crossed belts 27 extending between the pulleys 26 on the shafts 19 and 21 and the pulleys 26 on the shafts 18 and 20, the latter shafts with their attached rolls 24 are caused to rotate clockwise. The direction of rotation of the pair of rolls 24 upon the shafts 20 and 21 as well as that of the rolls 24 upon the shafts 18 and 19 is indicated by the arrows upon the portions of the rolls which extend into the trough 15. Thus, the peripheral surface of the rolls 24 within the trough 15 are moved in the same direction as the conveyer 10.

The pair of rollers 24 upon the shafts 20 and 21 are driven at a relatively low speed relative to the speed of the belt 10 and of the rollers 24 upon the shafts 18 and 19. This is effected by having the diameters of the pulleys 28 and 32 relatively large and small, respectively. In the particular arrangement shown in the drawings, the operation of which will be presently described, it will be assumed that the peripheral speed of the pair of rolls 24 upon the shafts 18 and 19 is equal to the surface speed of the belt 10, although this is not essential as long as the peripheral speed of the pair of rolls 24 upon the shafts 20 and 21 is relatively low as compared to the surface speed of the belt.

In the operation of the mechanism, referring particularly to the diagrammatic views (Figs. 4 to 7, inclusive) and first to Fig. 4, the carton A, which, in Fig. 1, is being advanced by the belt 10 toward the right hand pair of rolls 24, has been gripped by the latter rolls and its previous rate of movement with the belt 10 has been retarded due to the grip of the rolls thereon, the peripheral speed of these latter rolls, as hereinbefore described, being relatively low as compared to the surface speed of the belt as well as the peripheral speed of the left hand rolls 24. It will be assumed that a following carton B, shown abutting the carton A, is adhering to the latter carton due to wet mucilage.

The advancing but retarded carton A, referring to Fig. 5, is just being released from the right hand rolls 24 and about to be gripped by the left hand rolls 24, at which instant the carton B will be gripped by the right hand rolls 24. The grip of the left hand rolls 24, together with the conveying action of the belt 10 upon the carton A and the retarding action of the right hand rolls upon the carton B, effects a positive separation of the cartons, as indicated at 34 (Fig. 6). The carton C (Fig. 5), which is following the carton B, was placed upon the belt 10 in spaced relation with the carton B, as indicated at 35, and is being advanced with the latter carton at the same speed by the belt, since the carton B has not been gripped by the right hand rolls 24.

In Fig. 6, the space 35 occurring in Fig. 5 between the cartons B and C has been closed up due to the retarding action of the right hand rolls 24 upon the carton B and it will be obvious that the space 34 between the cartons A and B will continue to increase until the carton B is gripped by the left hand rolls 24, at which instant the desired uniform spacing between successive cartons is effected, such space being indicated at 36 in Fig. 7.

As each carton 11 is gripped by the left hand rolls 24, the desired spacing from the previously advanced carton is effected and this spacing of successive cartons will be maintained during their advance with the belt 10. Consequently, as the cartons approach the deflectors and chutes, previously mentioned, they will be spaced from each other a desired uniform distance, thus permitting the cartons to be directed by the deflectors one at a time into a chute.

It will be apparent that the retarding action of the right hand pair of rolls 24 upon the cartons being conveyed by the belt 10 and consequently the distance the cartons are spaced apart, as indicated at 36, may be varied to suit the particular conveyer system by varying the relative diameters of the pulleys 28 and 29. Also the spacing between the pairs of rolls 24 longitudinally of the belt 10 and between the rolls of each pair will depend on the dimensions of the particular article being handled. For the best results, the distance between the shafts of the pairs of rolls 24 should be slightly greater than the length of the article, as shown in the drawings, so that both pairs of rolls will not be operatively engaging an article at the same instant.

It will be apparent that the left hand pair of rolls 24 can be omitted in the case of articles being conveyed where there is no tendency of successive articles to stick together, since the action of the right hand pair of rolls 24 upon the articles passing therebetween will effect the desired spacing between the articles.

From the above description, it will be obvious that a simple and practical article spacing mechanism for use in a conveyer system is provided by means of which successive variously spaced articles, articles in free end to end contact, or articles tending to stick together, will be positively separated a desired uniform distance and will maintain such spacing during the conveying thereof for subsequent handling in the system.

Various modifications and applications of the invention will suggest themselves to those skilled in the art, and such modifications and applications as fall within the spirit of the invention are intended to be covered by the scope of the appended claims.

What is claimed is:

1. In a conveyer system, a conveyer moving at a predetermined speed upon which articles placed thereon freely rest during their advance, a plurality of movable means spaced longitudinally along a portion of said conveyer moving in a horizontal plane adapted to operatively engage the articles in their movement therepast, the points of engagement of said movable means with the articles being spaced apart a distance slightly greater than the length of an article, and means for operating said spaced movable means at different speeds, the first of said means with which the articles are engaged being operable at a relatively lower rate of speed than said conveyer so that the movement of the articles is retarded, the second of said means with which the articles are engaged being operable at a relatively higher rate of speed than said first means and the combined action of said spaced movable means causing a positive separation and a uniform spacing between successive articles initially variously spaced, in end to end contact, or when tending to stick together upon moving past said spaced movable means.

2. In a conveyer system, a conveyer belt moving at a predetermined speed upon which articles freely rest during their advance, two pairs of rolls spaced longitudinally in pairs along a portion of said belt moving in a horizontal plane adapted to peripherally operatively engage opposite sides of the articles in their movement therepast, the peripheral points of engagement of said rolls with the articles being spaced apart a distance slightly greater than the length of an article, and means for driving said pairs of rolls at different speeds with their peripheral surfaces at their points of engagement with the articles moving in the direction of said belt, the first of said pair of rolls with which the articles are engaged being driven at a relatively lower rate of speed than said belt so that the movement of the articles is retarded, the second pair of rolls with which the articles are engaged being driven at a relatively higher rate of speed than said first pair of rolls and the combined action of said spaced pairs of rolls causing a positive separation and a uniform spacing between successive articles initially variously spaced, in end to end contact, or when tending to stick together upon moving past said spaced pairs of rolls.

EDD C. LANG.